United States Patent [19]

Redfern

[11] Patent Number: 5,714,023
[45] Date of Patent: Feb. 3, 1998

[54] METHOD FOR SEALING TWO COMPARTMENT CONTAINERS

[75] Inventor: Michael A. Redfern, Franklin Park, N.J.

[73] Assignee: Wheaton Holdings, Inc., Wilmington, Del.

[21] Appl. No.: 605,850

[22] Filed: Feb. 23, 1996

[51] Int. Cl.$^6$ .............................. B65B 7/14; B65B 51/14; B65B 35/22
[52] U.S. Cl. .................. 156/69; 53/469; 53/479; 222/94; 222/145.1
[58] Field of Search .................. 156/69, 288, 308.4, 156/309.6; 222/94, 145.1; 53/469, 479, 373.7, 374.8

[56] References Cited

U.S. PATENT DOCUMENTS

| | | | |
|---|---|---|---|
| 2,898,257 | 8/1959 | Carver | 156/288 |
| 3,782,600 | 1/1974 | Columbus | 222/94 |
| 3,966,524 | 6/1976 | Lehmaches | 156/288 |
| 5,144,788 | 9/1992 | Varlet | 53/469 |
| 5,244,120 | 9/1993 | O'Meara | 222/94 |
| 5,269,441 | 12/1993 | O'Meara | 222/94 |
| 5,388,727 | 2/1995 | Jouillat | 222/94 |

*Primary Examiner*—Daniel Stemmer
*Attorney, Agent, or Firm*—Eugene E. Renz, Jr.

[57] ABSTRACT

A method for sealing the open end of two compartment containers which are filled through an opening in the lower terminal end of each compartment. The method consists of placing a steel platen between the compartments at the lower end terminal edges of each compartment so that the terminal edges confront the opposing side faces of the platen. The lower terminal edges are then heated and a pair of dies are activated towards and away from one another to apply pressure to the lower terminal edges to seal the edges against the platen.

3 Claims, 2 Drawing Sheets

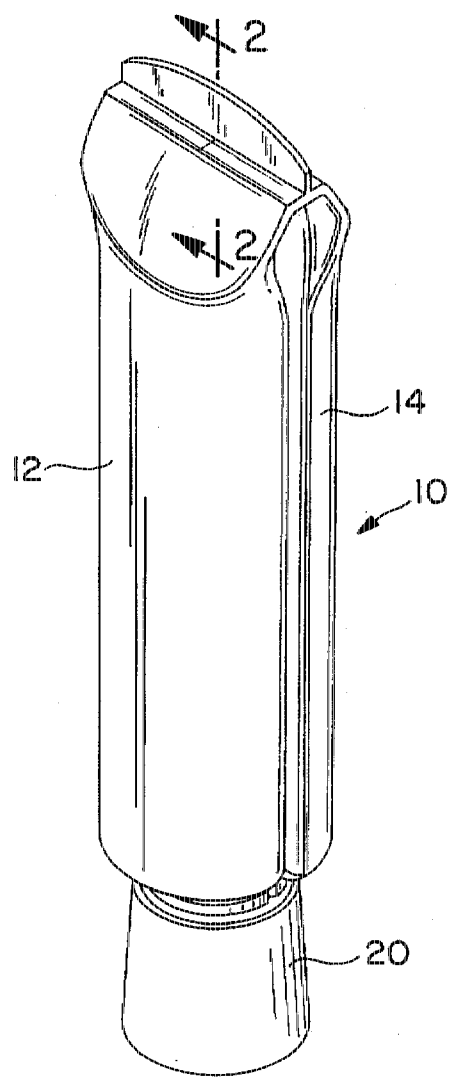
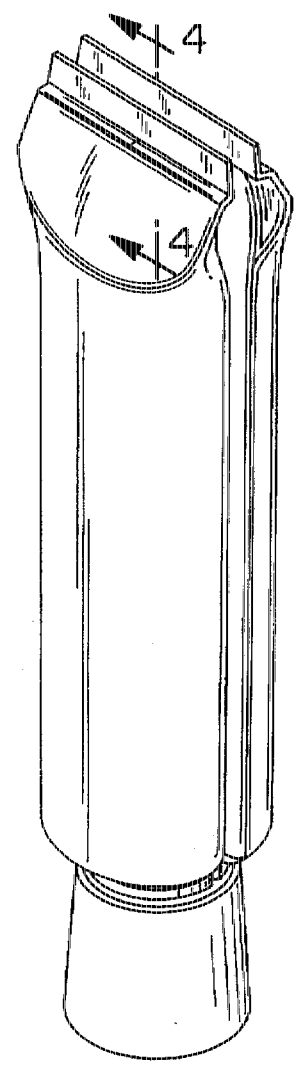
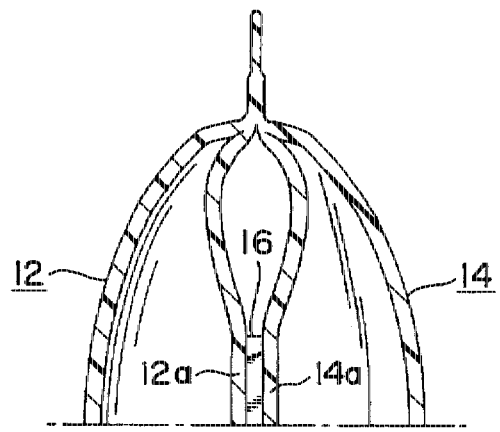
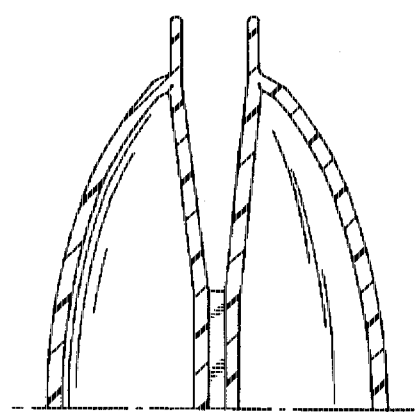
FIG. 1 (PRIOR ART)
FIG. 3
FIG. 2 (PRIOR ART)
FIG. 4

METHOD FOR SEALING TWO COMPARTMENT CONTAINERS

FIELD OF THE INVENTION

The present invention relates broadly to methods for making plastic containers and more particularly to improvements in methods for sealing so called two compartment containers.

BACKGROUND OF THE INVENTION

Two compartment containers of the type to which the present invention relate are not new per se. A typical dual chamber medicament dispenser is shown in prior U.S. Pat. No. 5,244,120 issued. As shown therein, the container is of generally cylindrical shape and has a common wall segment dividing the container into two compartments which are open at the bottom end and typically the compartments are filled from the lower end and then the lower terminal edges sealed by application of heat and pressure. In the present instance, the seal at the lower edge is a 3-ply seal.

Another similar two compartment container arrangement is shown in O'Meara U.S. Pat. No. 4,884,703 for CONTAINER AND CLOSURE ASSEMBLY issued Dec. 12, 1989. This container is similar to that shown in the O'Meara U.S. Pat. No. 5,244,120 for DUAL CHAMBER MEDICAMENT DISPENSER issued Sep. 14, 1993 to the extent that the container has a common dividing wall defining two chambers.

There is also prior art showing similar arrangements where the two chambers are formed by discrete separate containers joined in siamese fashion along a longitudinal axis. These containers are filled separately and then the lower edges are heat sealed together in a 4-ply seal.

The 3 and 4-ply prior art assemblies have certain disadvantages and drawbacks. For example, the bulkier the seam, the greater the time required in the heating and clamping cycle for achieving an adequate seal in automated assembly systems for filling and sealing two compartment containers, it is noted that controlling the temperature during the sealing operation is important. For example, if the heating temperature is too high to speed up the sealing cycle, the plastic flow may be excessive under clamping and could result in a very weak sealing area. More specifically, excessive plastic flow produces too much plastic in one area and produces uneven flow of plastic in the sealing zone and creates weakened areas in the sealing zone.

Further in bonding four layers, the head space which is the distance between the top surface of the liquid medicament and the terminal edge of the open tube is greatly reduced in sealing since more of the tube body is deformed in creating a 4-ply seal. This shortening of the space is best illustrated in FIG. 2. Accordingly, the tube body must be lengthened to compensate for this reduction in the head space.

Weaknesses or a defective seal in a 4-ply assembly also raises the risk of having a leakage path between the compartments thereby resulting in contamination of the product and reduced shelf life. In other words, premature mixing of the isolated products is undesirable and could present a hazard it the product is a medicament product for ingestion by human beings.

A drawback in making assemblies of this type is that the 3 and 4-ply assemblies tend to be rather bulky and present a rather unsightly and unattractive sealed edge. Furthermore, in some instances, the bonding has been less then complete and leakage has occurred through the edge seam.

With the foregoing in mind, it is an object of the present invention to provide a two compartment container closure assembly which is easy and economical to manufacture and use and which overcomes the drawbacks of the prior art discussed above. To this end in accordance with the present invention, a rather simple method is provided for heat sealing the lower edge of the discrete separate joined containers at their lower selvedge edge by conventional heat and pressure sealing apparatus systems utilizing a baffle separating the lower edges of the containers in the final sealing process. This produces effective sealing of each of the containers and a rather attractive finish to the lower end of the assembly.

SUMMARY OF THE INVENTION

The present invention provides a novel method for sealing two compartment container assemblies which eliminates the disadvantages and drawbacks of the prior art noted above. For example, in accordance with the present invention, the heating and clamping cycle is greatly reduced and since the number of plies being bonded is reduced, there is better control and undesirable plastic flow producing erratic sealing is eliminated. Additionally as illustrated in FIG. 4, for comparable size compartments, the head space is not reduced. Further, there is less deformation of the tube body and less stress, the tube lower end having smooth transitions to the sealed areas. Further, the separate sealing insures isolation of the compartments and thereby eliminates the problem of cross contamination. The separate sealing also provides a more attractive finish.

The present invention provides improvements over the prior art and advantages in the sealing operation which essentially eliminates the risk of delamination and also expedites and speeds up the process of effectively sealing two compartment containers of the type shown and described. Essentially, the present invention seals two (2) layers at a time instead of four (4) and this eliminates the creasing that occurs and fold points in the critical sealing area. Furthermore, the separate sealing of the two compartment segments facilitates placing separate lot numbers identifying the product contained in each compartment. This is an important feature required by the FDA in the packaging of some pharmaceutical products.

BRIEF DESCRIPTION OF THE DRAWINGS

These and other objects of the present invention and the various features and details of the operation and construction thereof are hereinafter more fully set forth with reference to the accompanying drawings; wherein:

FIG. 1 is a perspective view showing a two compartment container of the type to which the present invention relates heat sealed at its lower edge by conventional means and is exemplary of the prior art;

FIG. 2 is an enlarged fragmentary sectional view taken on lines 2—2 of FIG. 1;

FIG. 3 is a perspective view of a two compartment container sealed by the method of the present invention;

FIG. 4 is a enlarged fragmentary sectional view taken on lines 4—4 showing the seal lowered terminal edges of the two compartment container;

DETAILED DESCRIPTION OF THE PREFERRED EMBODIMENT

Figure 5:
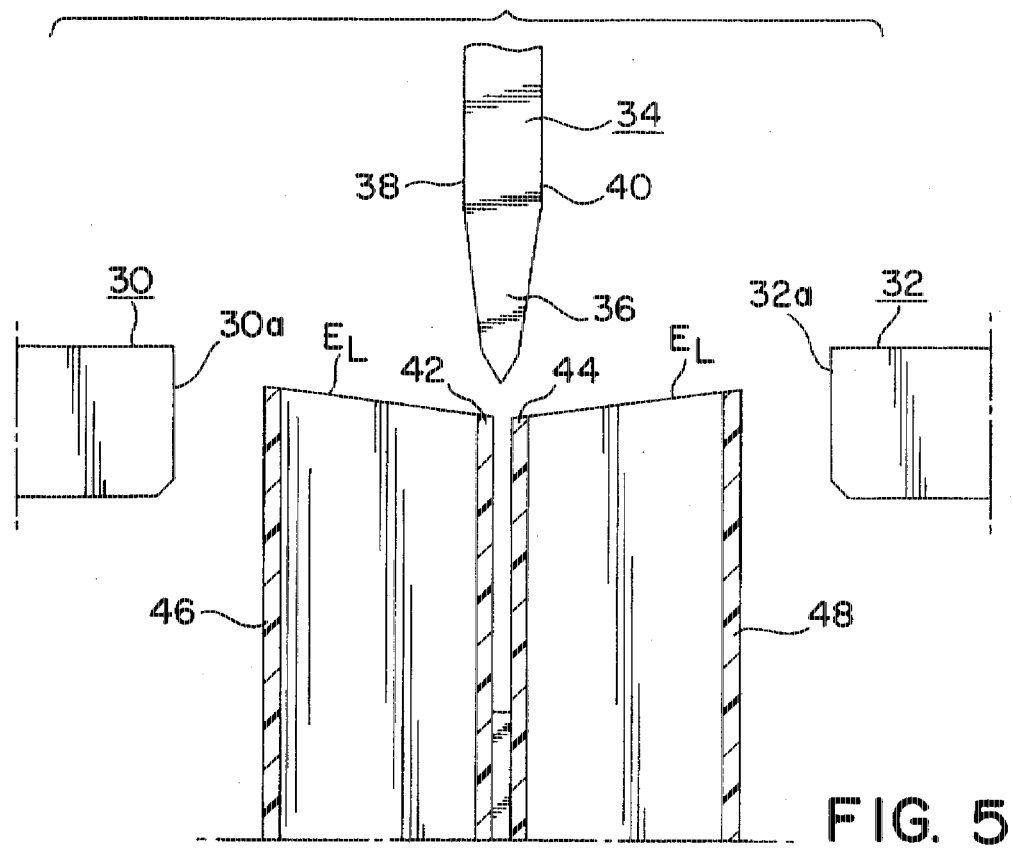
FIGS. 5 and 6 are schematic views showing the steps in the discrete heat sealing of the lower edges of each of the compartments of the two compartment container in accordance with the present invention.

Referring now the drawings, there is shown in FIGS. 1 and 2 a two compartment container closure assembly sealed at its lower end by prior art techniques. The container (10) comprises two (2) container segments (12) and (14) respectively which are connected at their confronting inner faces (12a) and (14a) respectively by a connecting wall (16). The top portion of the container is a conventional finish having external threads to receive a cap (20). Two compartment containers of this type have a myriad of usages. For example, pre-packaging of specific doses or quantities is important to save time during the application of medicine or chemicals which need to be mixed promptly or in precise quantities. Potent drugs which rapidly deteriorate when mixed together are easily and safely maintained in dual chambers to avoid pre-mixing. These containers have particular advantages for geriatric applications since they take the guess work out of mixing drugs in accurate proportions. Typically, the empty tubes are inserted and placed in tube holders, top down, open bottom up, for processing in automated filling, heating where the lower heated open bottom edges of the tube are brought together in a single plane and heat sealed under pressure. In accordance with the prior art, the seal produced at the lower terminal edge comprises four (4) contiguous wall thicknesses of the container at the lower edge. This seal is rather unseemly and unattractive seal. It has been found that even if great care is exercised in applying the seal, the 4-plies on occasion tend to delaminate producing undesirable leakage.

Figure 6:
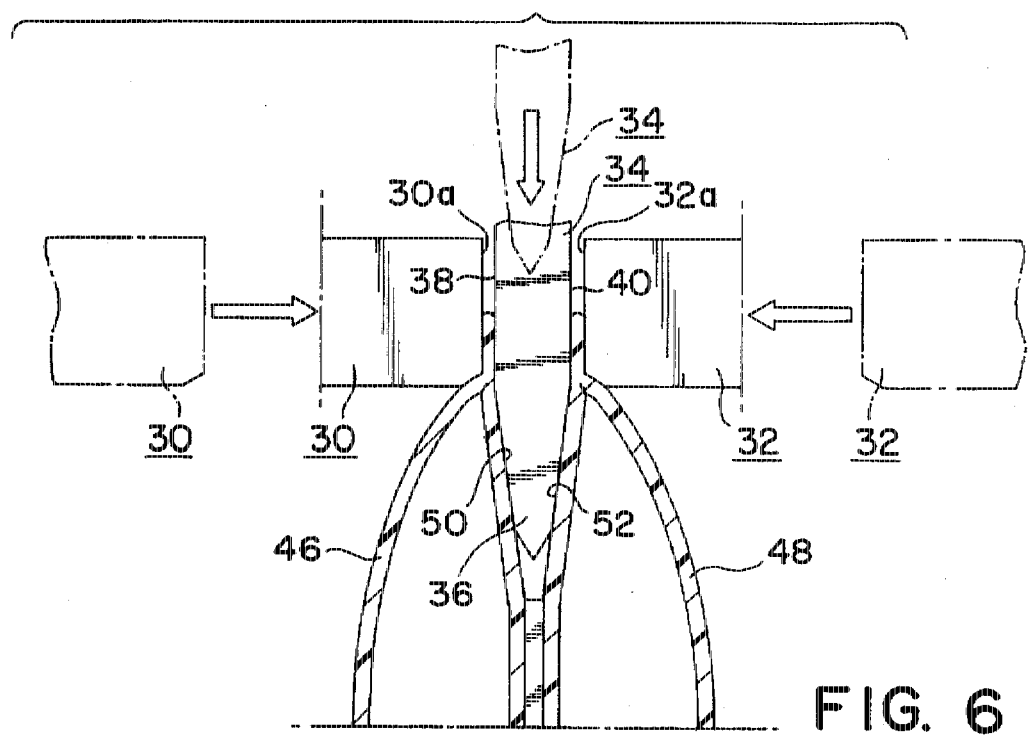

The present invention provides a simple solution to this problem by use of a method whereby the heated lower edges of each compartment A and B of tube (10) are brought together and independently sealed in a single operation. After filling the two compartments with a desired volume of liquid medicaments A and B and providing for a calculated head space where the filled tube is moved to the heating station. The improved method of present invention is shown schematically in FIGS. 5 and 6. As shown therein, a pair of dies (30) and (32) mounted for reciprocating movement toward and away from one another apply pressure to the plastic materials to be sealed. In accordance with the present invention, a divider platen (34) is provided which has an inwardly tapered beveled nose portion (36) and two planar surfaces (38, 40) extending rearwardly from the nose portion. The platen (34) is introduced between the inner confronting faces (42, 44) of the lower selvedge edges $E_L$ of the container segments (46, 48) in the manner shown in FIGS. 5 and 6 until the flat planar faces (38, 40) of the platen (34) are aligned horizontally with the flat faces ($30_a$) and ($32_a$) of the sealing dies. The interaction produced by activating the dies inwardly against the platen (34) seal the container segments separately. The tapered nose (36) also shapes the lower inner faces (50, 52) of the containers to provide an unstressed seal at the lower end of the two compartment container.

Even though a particular embodiment of the present invention has been illustrated and described herein, it is not intended to limit the invention and changes a modifications may be made therein within the scope of the following claims.

What is claimed is:

1. A method for sealing the open end of two compartment containers which are filled through an opening in the lower terminal end of each compartment consisting of the steps of:

placing a steel platen between the compartments at the lower end; and thereafter sealing the lower terminal edges of each compartment separately by application of heat and pressure wherein the lower edges of each compartment confront and engage the opposing side faces of the platen.

2. A method for filling and sealing plastic containers having two compartments consisting of the steps of:

filling each compartment through openings in the lower part of each compartment;

placing a rigid platen having a pair of opposing faces between the lower terminal edges of each compartment so that the terminal edges confront the opposing side faces of the platen; and heating the lower terminal edges; and activating a pair of dies toward and away from one another to apply pressure to the lower terminal edges to seal the same against the platen.

3. A method for filling and sealing plastic containers having two compartments consisting of the steps of:

filling each compartment through openings in the lower part of each compartment;

placing a rigid platen having a tapered nose and a pair of opposing faces between the lower terminal edges of each compartment so that the terminal edge confront the opposing side faces of the platen;

heating the lower terminal edges; and activating a pair of dies toward and away from one another to apply pressure to the lower terminal edges to seal the same against the platen, the inner faces of the containers adjacent the lower edges by the tapered nose of the platen providing an unstressed seal at the lower end of the two compartment container.

* * * * *